US011971008B2

(12) United States Patent
Calle Madrid

(10) Patent No.: US 11,971,008 B2
(45) Date of Patent: Apr. 30, 2024

(54) WIND WALL

(71) Applicant: Alfredo Raul Calle Madrid, Lima (PE)

(72) Inventor: Alfredo Raul Calle Madrid, Lima (PE)

(*) Notice: Subject to any disclaimer, the term of this patent is extended or adjusted under 35 U.S.C. 154(b) by 45 days.

(21) Appl. No.: 17/434,088

(22) PCT Filed: Aug. 20, 2019

(86) PCT No.: PCT/PE2019/050001
§ 371 (c)(1),
(2) Date: Aug. 26, 2021

(87) PCT Pub. No.: WO2021/034203
PCT Pub. Date: Feb. 25, 2021

(65) Prior Publication Data
US 2022/0349375 A1    Nov. 3, 2022

(51) Int. Cl.
*F03D 1/04* (2006.01)
*F03D 1/02* (2006.01)

(52) U.S. Cl.
CPC ............... *F03D 1/04* (2013.01); *F03D 1/02* (2013.01); *F05B 2240/13* (2013.01); *F05B 2240/133* (2013.01); *F05B 2240/40* (2013.01); *F05B 2250/27* (2013.01)

(58) Field of Classification Search
CPC .......... F03D 1/04; F03D 1/02; F05B 2240/13; F05B 2240/133; F05B 2240/40; F05B 2250/27
See application file for complete search history.

(56) References Cited

U.S. PATENT DOCUMENTS

| 9,203,257 | B1* | 12/2015 | Zaman | H02J 7/0068 |
| 2007/0015452 | A1* | 1/2007 | Chen | F03D 1/04 454/121 |
| 2010/0310361 | A1* | 12/2010 | Carre | F03D 9/255 415/199.5 |
| 2013/0235897 | A1* | 9/2013 | Bouteyre | G01M 99/002 374/4 |
| 2014/0308120 | A1* | 10/2014 | Komp | F03D 1/04 415/218.1 |
| 2014/0319842 | A1* | 10/2014 | Barsacq | F03B 17/062 290/55 |
| 2015/0244220 | A1* | 8/2015 | Yost | H02K 1/30 310/156.36 |
| 2016/0251964 | A1* | 9/2016 | Solorzano | F03B 17/061 415/121.3 |
| 2019/0153992 | A1* | 5/2019 | Schurtenberger | F03B 11/025 |
| 2020/0370574 | A1* | 11/2020 | Jan | F15D 1/02 |

* cited by examiner

Primary Examiner — Mickey H France
(74) Attorney, Agent, or Firm — Eugenio J. Torres-Oyola; Victor M. Rodriguez-Reyes; Rafael Rodriguez-Muriel

(57) ABSTRACT

The wind wall is a solid structure composed of modular wind cells; the joint between two adjoining wind cells, seen from a cross-section that passes parallel through the axes of axial symmetry of both wind cells, include a shape of a complete airfoil, and both wind cells are arranged sharing a same chord; where this chord is contained by the adjacent outer section of both wind cells. It is an aerodynamic structure specially designed to increase the wind speed within a critical space and, therefore, increase the wind power available to be used by the rotor of a wind turbine.

7 Claims, 6 Drawing Sheets

WIND WALL

TECHNICAL FIELD

The technical field corresponding to this innovation belongs to wind energy, whose main attributes are related to the increase and improvement of the process of conversion of the kinetic energy of the wind into mechanical energy for its subsequent use and conversion into electrical energy.

The present invention, which we will call from now on, "Wind Wall", refers to a new wind system by itself, showing a much higher productive efficiency than the conventional wind systems (wind farms) for the use of kinetic wind energy available in nature. In this sense, the application of the Wind Wall has a significant potential in improving performance, efficiency, power and, consequently, the capacity to generate electric power from wind energy.

STATE OF THE ART

Fundamentals of wind systems

A) Kinetic energy of the wind: the wind is a mass of air in movement that flows regularly in horizontal direction from a high-pressure area towards one of low pressure. Every element of mass in motion has a certain amount of kinetic energy (Ec), which is proportional to the square of its speed (V) and its mass (m) respectively.

$$Ec = \tfrac{1}{2} \cdot m \cdot (V)^2$$

B) Force of the wind: the force of the wind is measured not only by the kinetic energy present in the wind, but also by the projected and aerodynamic area of the body or element that faces the movement of the wind and subtracts kinetic energy correspondingly. The equation that governs the force of the wind is the following:

$$F = (\text{Dynamic Pressure}) \cdot (\text{Projected Area}) \cdot (\text{Aerodynamics coefficient}) \quad F = \tfrac{1}{2} \cdot p \cdot (V^2) \cdot A \cdot Cd$$

Where:
F=Force of the wind
p=Air density
V=Wind speed
A=Area of reference o projected area of object facing the wind
Cd=Drag aerodynamics coefficient (resistance)
Force of wind is physically expressed as kilogram-meters/second squared, or Newtons.

C) Maximum power extractable from the wind: the kinetic energy that passes through a reference surface (A) in a unit of time is the power (P). Considering that the wind is a fluid with kinetic energy, if an element is interposed in the middle of the wind, the wind after crossing it will have a speed V2 lower than the V1 it originally had (decrease in kinetic energy). The change in flow velocity implies that there has been a force on the interposer, or, in other words, energy has been drawn from the system through the interposer.

Consider a wind flow that passes through a cylindrical body, the variable that interposes in the movement of said flow is made up of a rotor or propeller disc that is positioned perpendicular to the direction of the incident wind, which has a speed V1. The air that moves through the cylindrical body passes through the rotor, giving it part of its kinetic energy, reducing its speed to V2 and establishing the corresponding pressure difference on both sides of the cylindrical body.

The maximum extractable power from the wind is expressed as follows, its physical expression is made in Newton-meters per second, or Watts:

$$P = \tfrac{1}{2} \cdot p \cdot A \cdot (V^3)$$

Where:
P=Maximum extractable power from the wind
p=Air density
V=Wind speed
A=Projected area of object facing the wind
Therefore, the maximum extractable power (P) per square meter or projected area (A) is expressed as follows:

$$P/A = \tfrac{1}{2} \cdot p \cdot (V^3)$$

Conventional Wind Systems:

Currently, conventional wind systems are composed of a set of open wind turbines, distributed and separated from each other on a field with the appropriate wind conditions for the harvesting of wind energy (wind farms). Conventional wind turbines are designed to take advantage of the kinetic energy of the wind found in nature, transforming said kinetic energy into electrical energy, which is achieved through complex engineering consisting of aerodynamic propellers, rotors, low and high speed shafts, revolution multipliers, hydraulic and mechanical brakes, electric generators, voltage transformers, cooling units, electronic sensors and controllers, wind guidance systems, speed regulation systems and power regulation systems, among other technical elements.

A) Energy transformation of wind systems: in conventional wind systems the capturing element consists of a rotor that transforms the kinetic energy of the wind into mechanical energy that is transmitted to an electric generator for its transformation into electric power. The main element of the rotor (or propeller) is the blade.

The design of a wind system is a complex task that requires integrating the knowledge of different disciplines to convert the kinetic energy of the wind into an aerodynamic thrust and subsequent rotational moment with the least residual air energy possible. In addition to aerodynamics, structural aspects (static and dynamic) related to efficiency, effectiveness, performance, noise, vibrations, useful life, among others, must be taken into account. As a first approximation it is necessary to know how much power the rotor can generate, the starting speed, the maximum permissible speed, the orientation systems of the wind direction, the speed and power regulation systems, and so on.

B) Levels of use of wind systems and the effectively extractable power of the wind: the laws of physics do not allow that the bulk of the kinetic energy of the wind be used. The maximum extractable wind power is defined by the Betz Limit, which indicates that a wind turbine can convert a maximum of 59.26% of the kinetic energy of the wind impacting it into mechanical energy.

The wind energy captured by the rotor of the wind system is known as harnessed wind energy. The conversion efficiency is described as the Conversion Coefficient (Cc) defined as the ratio between the harnessed wind energy and the available kinetic energy. That is, only a fraction of the kinetic energy of the wind is converted into electrical power.

The variables that affect the Conversion Coefficient are not only limited to the Betz Limit, but also to the aerodynamic losses, the Weibull distribution of the wind, the mechanical conversion losses, the losses of the electric generator, the operating parameters, among others. Nonetheless, the advances obtained, linked to harnessing the kinetic energy of the wind and limiting the losses of the wind system itself, yields a kinetic energy usable by the state of the art of around 40%.

In this way, the effectively extractable power of the wind or Effective Power of the Wind System (PE) is a fraction, equal to the Conversion Coefficient, of the function related to the maximum extractable power of the wind, being the formula of the Effective Power of the wind, the following:

$$PE = \tfrac{1}{2} \cdot p \cdot A \cdot (V^3) \cdot Cc$$

Where:
PE=Power effectively extractable of the wind or Effective Power of the Wind
System
p=Air density
V=Wind speed
A=Projected area of object facing the wind
Cc=Conversion Coefficient C) Technical Issues of Wind Systems Speed regulation system: most of the current wind turbines have a constant speed: the rotation speed of their rotor must remain almost constant despite the variation of wind speed. In addition, a device must limit the power and protect the wind turbine from overexertion in the event of strong winds. These functions are assumed by the speed regulation system.

Conventional wind systems have a steerable speed regulation system by which the pitch angle is constantly changing; most systems consider fixed blades in a wide wind range. These methods have multiple advantages: they help to start the rotor, they position the angle of attack of the blade so that it is at the optimum operating point, they control the turns so that the generator is not overloaded, and they protect the entire system against damage due to high wind speed.

Power regulation: from the power perspective there are two sections: one is the connection of the generator to the grid when its turns are at synchronism speed. This condition occurs when there is no excess torque and the power generated is constant. The other is the rotor speed control, which avoids overloading the generator and the occurrence of damage to the Wind System.

Differences between a diffusing wind device and an amplifying wind device:

The diffuser is a physical element with a wind inlet opening smaller than the wind outlet opening. In terms of pressure, the diffuser is characterized by generating a high-pressure area around its structure and a low pressure area at the outlet of the wind. In terms of fluid dynamics, a diffuser creates a low-pressure environment that sucks in air and thus raises the wind speed through its structure. In terms of turbulence, a diffuser creates highly turbulent environments on a par with the low-pressure environments it generates.

On the other hand, the amplifier is a physical element with a wind inlet opening greater than the wind outlet opening. In terms of pressure, the amplifier is characterized by generating an area of high pressure at the entrance of the wind and an area of low pressure at the exit of the wind and, above all, around the structure of the amplifier. In terms of fluid dynamics, an amplifier generates an environment that pushes the air and thus raises the wind speed through its structure. In terms of turbulence, an amplifier (like the diffuser) creates high turbulence environments on a par with the low-pressure environments it generates.

For the case of each Wind Cell of the Wind Wall of the present invention, it cannot be defined within the categories of a diffuser or an amplifier, since it has as a precondition that both the wind inlet opening, and the wind outlet opening are equal in size. Another substantial difference is that the configuration of the Wind Cell of the present invention generates a very low-pressure environment within its own structure and, furthermore, with very low turbulence.

Background on Unconventional Wind Systems:

For purposes of developing this notion, we are going to focus the discussion on those antecedents of the state of the art related to unconventional wind systems linked to wind power amplification systems.

US 2012/0261925 A1, "Wind turbine shroud and wind turbine system using the shroud", it is a wind power system that uses a diffuser of cylindrical body that has a circular form which surrounds the rotor of the Wind turbine. The action of the diffuser generates a drop in static pressure at the outlet of the air flow, which would generate an increase in wind speed. In terms of performance, this invention postulates that it would be able to increase the wind speed by approximately 30-35% in the sections closest to the walls of the cylindrical body of the circular diffuser. This invention does not disclose results related to the amplification of wind energy obtained throughout the entire projected area of the wind turbine.

US 2010/0187828 A1, "Wind energy harnessing apparatuses, systems, methods, and improvements". It is a system that proposes improvements to wind farms by incorporating secondary wind turbines (placed in particular locations within the wind farm) for the generation of additional electrical energy through the use of Venturi tunnels that surround each secondary wind turbine. The action of the Venturi tunnels, built with a very specific geometric shape (fifth degree polynomial curve), would have the effect of increasing the wind speed on the secondary wind turbine (horizontal or Savonius type). In terms of yields, the invention postulates that it would be able to increase the installed capacity of a new or existing wind farm, by placing secondary wind turbines behind the primary wind turbines, but at a lower altitude. The invention does not disclose results related to the increase in speed or pressure differential produced by the specific geometric line of Venturi tunnels, nor does it disclose results related to the effect of trail and turbulence generated by primary wind turbines on secondary wind turbines.

WO 2010/005289 A2, "Wind turbine with diffuser". It is a wind turbine comprised of a horizontal axis wind rotor surrounded by a diffuser of particular characteristics whose function is to increase the performance of the wind turbine and reduce the noise caused by the operation of the rotor. The diameter of the outlet (wind) opening of the diffuser must be 8% larger than the diameter of the inlet (wind) opening. Optionally, the diffuser is integrated into a noise reduction device which is located at the height of the tips of the blades. In terms of performance, the invention postulates that the particular configuration of the diffuser manages to reduce noise pollution better than other existing diffusers. Additionally, the invention postulates that the greatest advantage, in terms of cost and productive efficiency, is achieved with diffusers of smaller magnitude (diameters less than 15 meters), so the invention would be applicable for wind turbines with an installed capacity of less than 100 kW (preferably 5 kW). This antecedent does not disclose results related to the increase in speed or pressure differential produced by the geometric line of the diffuser.

US 2013/0266446 A1, "Ringed airfoil with mixing elements", it is a wind turbine wrapped by a ringed diffuser which has interspersed openings along its structure with the purpose of configuring a mixture of air flows: a flow of air adjacent to the external part of the diffuser that then enters towards the internal part of the same and an air flow passes through the rotor in the direction of the wind through the inlet opening of the diffuser. In terms of performance, the invention postulates that it improves the means of extracting energy from the wind by means of the pressure differential generated by the diffuser and the mixture of fluids generated by the openings that cross the profile of the diffuser. Both effects produce a higher energy production of the turbine system. This invention does not disclose results related to the increase in speed or pressure differential produced by the geometric line of the diffuser.

WO 2018/117875 A1, "Wind energy amplifier in the form of a one-sheet hyperboloid". It is a wind amplifier with the shape of a hyperboloid of one leaf, which amplifies the speed of the wind over the blades of the wind system, by increasing the pressure and speed of the ambient wind by means of the continuous channeling of the flow through the structure of the wind amplifier. In terms of performance, this antecedent makes it possible to increase the wind speed by only 0.3 times and, consequently, to increase the force and kinetic energy of the wind. The potential benefits related to this invention are related to any system that intends to take advantage of wind energy for any purpose, without being limited to the generation of electricity. However, the increase of 0.3 times has been seen to be very small compared to other arrangements and geometric shapes that would allow the wind speed to be increased by 3.5 times. The geometric shape of the antecedent WO 2018/117875 A1 is based on an unfinished hyperboloid at the origin, while the Wind Wall of this proposed invention handles a complete geometry, with two unfinished hyperboloids at the origin, each one for the entry and exit of the wind, respectively; likewise, this antecedent is not enclosed under any structure, while the Wind Wall has a structure that encloses the geometric figures of the Internal Aerodynamic Chamber. In addition to the above, WO 2018/117875 A1 presents a relatively low effective turbulence suppressor, while this present invention manages to control laminar flow and eliminate turbulence from the wind outlet in an effective way by means of the proposed Turbulence Suppressor Space. Thus, this antecedent does not disclose results related to the increase in speed or pressure differential produced by the geometric line of the amplifier, nor does it disclose the effects generated by the invention in terms of turbulent flow. On the other hand, the hyperboloid of one leaf shaped wind amplifier of the antecedent, due to its own aerodynamics, does not have the ability to interact with lift forces of the type produced by an airfoil. That is to say, the only thing that would be shared between the wind amplifier, in the form of a hyperboloid of one leaf, and the Wind Wall is a similarity in their resistance coefficients. However, while the Wind Wall presents relevant lift coefficients, thanks to its Wind Cells with aerodynamic profile, the wind amplifier, in the shape of a hyperboloid of one leaf, presents negligible lift coefficients.

BRIEF DESCRIPTION OF THE INVENTION

As a solution to the limited advances focused on amplifying the wind's kinetic energy with greater efficiency, the present invention solves this shortcoming of the state of the art through a new wind system based on a physical, modular and aerodynamic structure, hereinafter called "Wind Wall", which has the trait of efficiently amplifying the wind energy available in nature, raising the wind speed within a Critical Space (504), through the deliberate creation of environments with stable high pressure differentials and stable laminar flow. In this sense, given a certain wind energy found in nature, the Wind Wall (101) allows to obtain a driven increase in the intensity of the wind's kinetic energy and, consequently, a usable increase in the wind power density.

In addition, the Wind Wall (101) must be understood as that solid structure composed entirely of a finite number of individual and aerodynamic units (hereinafter referred to as "Wind Cells"), arranged adjacent to each other, one next to the other, in an ordered and symmetrical scheme, and in such a way that as a whole they form a continuous structure of Wind Cells (104), sustainable by itself and modular along the three physical dimensions in terms of height, length and width. That is, by using Wind Cells (104) it is possible to build a Wind Wall (101) of completely modular dimensions in such a way that the resulting aerodynamic structure is an optimized structure for certain environmental, technical and economic conditions.

Complementarily, a Wind Cell should be understood as that aerodynamic and individual structure, functional by itself, composed by an Adjacent External Section (404) and, on the other hand, composed by an Internal Aerodynamic Chamber (501), composed in turn by a front section, a middle section and a posterior section.

The Adjacent External Section, or Shared Closed Chord (404), is the adjacent or adjoining section that each Wind Cell (104) shares with the other Wind Cells located in the vicinity. In other words, each Adjacent External Section (404) is the physical limit shared by each of the Wind Cells (104) that make up the Wind Wall (101).

The Internal Aerodynamic Chamber (501) is the internal section of a Wind Cell (104) corresponding to the interior space where the pressure differentials and the lift and drag forces created by an upper face airfoil in revolution, are generated.

The airfoil of the internal aerodynamic chamber, seen from a cross section parallel to the axis of symmetry, is partially based on the upper face profile of the airfoil of a symmetric aerodynamic profile. The profile uses the extrados (upper face) of the airfoil as the internal face of the Internal Aerodynamic Chamber (501).

In a preferred and more specific embodiment, the airfoil in revolution comprises the shape of a double hyperboloid profile, whereby the double hyperboloid profile includes an inlet hyperboloid (506) facing the direction of the wind, arranged adjacently and perpendicular to the wind inlet opening (406), and an outlet hyperboloid (507) not facing the direction of the wind, positioned adjacent and perpendicular to the wind outlet opening (407); where the geometric shapes of the inlet hyperboloid (506) and the outlet hyperboloid (507) of the same Wind Cell are different from each other, with the magnitude or internal volume of the inlet hyperboloid (506) being smaller than the magnitude or internal volume of the outlet hyperboloid (507); where the inlet hyperboloid (506) and the outlet hyperboloid (507) are of one unfinished leaf and joined at the origin by identical circles in such a way that the connection between both geometric figures is continuous, that is, that the inlet hyperboloid (506) and the outlet hyperboloid (507) together form a geometric figure with continuous axial revolution symmetry.

The Internal Aerodynamic Chamber (501), being a whole with its components regardless of the specification level of the profile used, configures three differentiable areas, which show very different observable physical magnitudes. Said differentiable areas are, in the order of the wind direction: i) the front section or pressure generating space (503), ii) the middle section or critical space (504); and (iii) a posterior section or turbulence suppressing space (505). The Pressure Generating Space (503) is that space whose axial axis is aligned to the wind direction and whose reference surface faces the wind direction, being a space characterized by supporting the greatest resistance force of the wind and presenting the greatest pressure levels. The Critical Space (504) is that space located between the Pressure Generating Space (503) and the Turbulence Suppressing Space (505), characterized by presenting the highest records of the wind speed and dynamic pressure of the system. In this sense, the Critical Space (504) constitutes that space where the Wind Turbine rotor must be located. The Turbulence Suppressor Space (505) is that space whose axial axis is aligned to the direction of the wind, but whose reference surface does not face the direction of the wind, characterized by presenting a space conducive to the maintenance of laminar flow and leveling of wind speed and pressure relative to the surrounding environment.

It is important to point out that the area covered by the plane of the Wind Inlet Opening (406) located in the Pressure Generating Space (503) of the Internal Aerodynamic Chamber (501) must be of the same dimension, or preferably with substantially equal dimensions, as the area of the plane of the Wind Outlet Opening (407) located in the Turbulence Suppressor Space (505) of the same Internal Aerodynamic Chamber (501). The above is an important difference that allows us to distinguish ourselves from the disadvantages of a diffuser or amplifier wind device.

The foregoing represents an improvement in the state of the art since the Wind Wall (101) manages to exceed the performance of a conventional wind system, achieved through a significant increase in wind speed and, therefore, an increase of the intensity of the kinetic energy within a Critical Space (504) of the Internal Aerodynamic Chamber (501) of the Wind Cell (104), which translates into an increase in the power density of the wind system.

According to the Computational Fluid Dynamics (CFD) simulations we carried out, the Wind Wall would allow increasing the wind speed, within the Critical Space (504), by around 3.5 times, taking into account that the maximum amplification of the achievable wind speed is indeterminate (but not infinite), for it will depend on the respective configurations of the projected area and the aerodynamic coefficients of the Wind Wall as a whole.

DETAILED DESCRIPTION OF THIS INVENTION AND PREFERRED EMBODIMENTS

Figure 1:
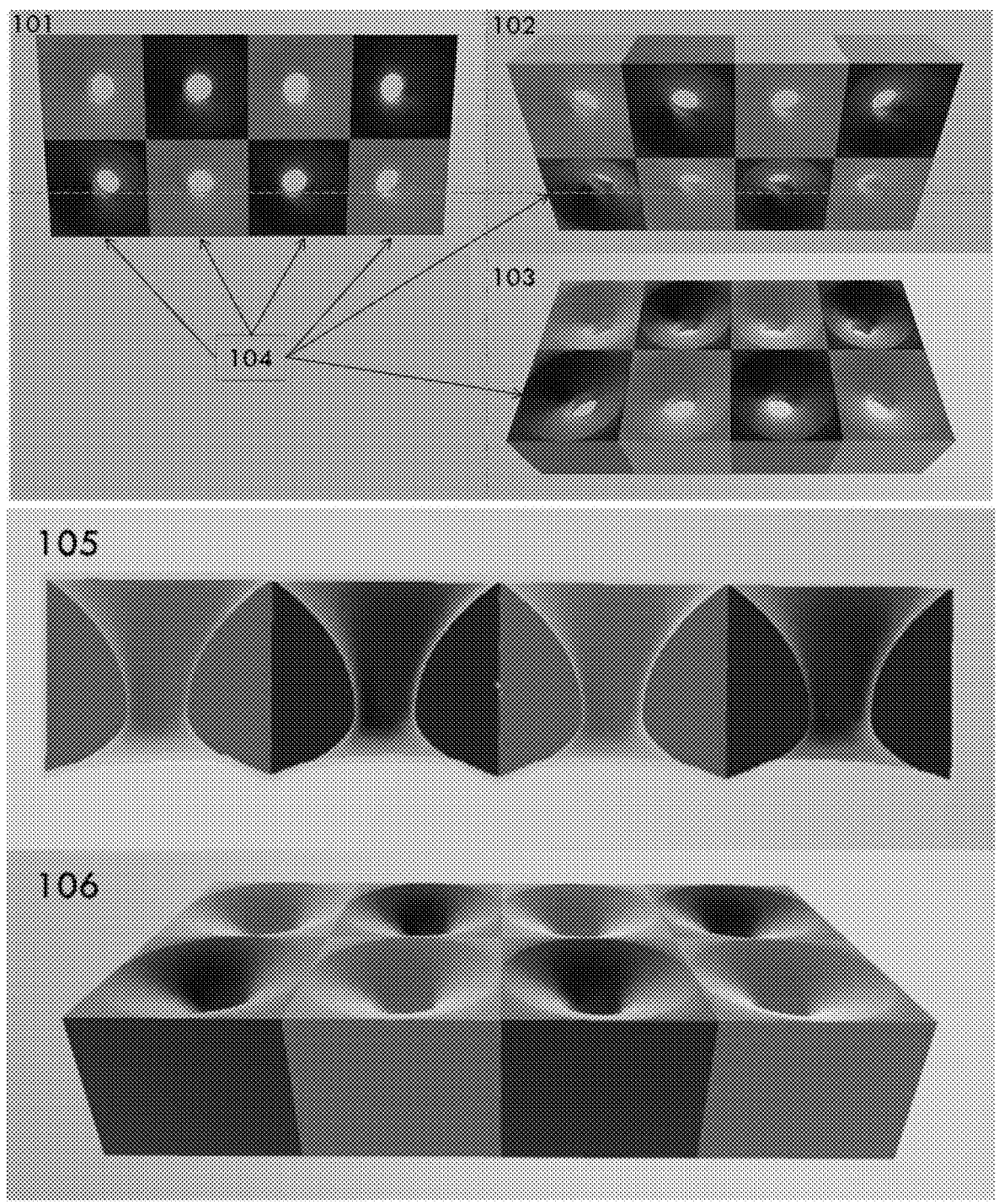
FIG. 1: Solid view of the Wind Wall
101 Front view of the Wind Wall composed of Wind Cells
102 Front view of the Wind Wall composed of Wind Cell—top focus
103 Front view of the Wind Wall composed of Wind Cell—bottom focus
104 Wind Cells components of the Wind Wall
105 Oblique view of the Wind Wall composed of Wind Cells
106 Top view of the Wind Wall composed of Wind Cells
107 Bottom view of the Wind Wall composed of Wind Cells
Figure 2:
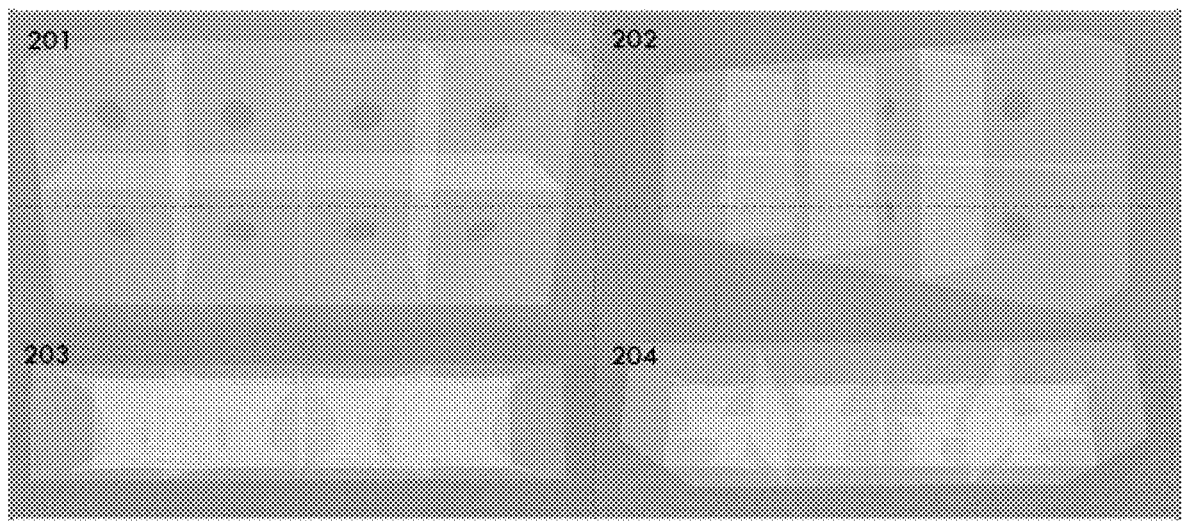
FIG. 2: Transparent view of the Wind Wall
201 Front view of the transparent Wind Wall
202 Oblique view of the transparent Wind Wall from the side
203 Top view of the transparent Wind Wall
204 Oblique view of the transparent Wind Wall from above

The wind, being an element of air mass in motion, has a certain amount of kinetic energy that is proportional to its mass and exponentially proportional to its speed. Therefore, consider for the description of the present innovation, the following equations that govern the wind force and the available power, respectively:

$$F = \tfrac{1}{2} \cdot p \cdot (u'^2) \cdot S_{ref} \cdot C_A$$

$$P = \tfrac{1}{2} \cdot p \cdot S_{ref} \cdot (u^3)$$

$$PE = \tfrac{1}{2} \cdot p \cdot S_{ref} \cdot (u^3) \cdot C_c$$

Where:
F=Wind force
P=Available power
PE=Effective power of the wind system
p=Air density
u=Wind speed
$S_{ref}$=Reference surface of the object under study
$C_A$=Aerodynamic coefficient of the object facing the wind
$C_c$=Conversion Coefficient The equations described above show that, in the event of variations in wind speed, the changes in available power will be cubically exponential. In other words, the higher the wind speed, the greater the power available for a wind system.

The force of the wind is physically expressed as kilogram-meters/second squared, or Newtons. The available power of the wind is physically expressed as Newton-meters per second, or Watts. On the other hand, the aerodynamic coefficient can be expressed, depending on the force under study, as drag coefficient, lift coefficient or lateral coefficient. Additionally, the reference surface can be expressed, depending on the force under study, as the projected area, the blade surface or the lateral surface.

Due to the exponential relationship between wind speed and available power, small increases in wind speed generate large increases in available power. In other words, the Wind Wall has a significant impact on the effective power generated by a Wind turbine through increases in dynamic pressure and wind speed.

Having established the exponential relationship between the wind speed and the available power of the wind, therefore, the incidence of the Wind Wall (101) on the wind speed is also established.

The Wind Wall (101) being an aerodynamic body that has a positive impact on the wind speed projected on the rotor of the Wind system—achieved through the increase in the pressure differential and, consequently, in the wind speed existing in nature—, for the description of this innovation, consider the following equations that govern the magnitudes and aerodynamic coefficients of the Wind Wall (101):

$$F_{AMP} = F_D + F_L + F_S$$

$$F_D = \tfrac{1}{2} \cdot p \cdot (u^2) \cdot A \cdot C_D$$

$$F_L = \tfrac{1}{2} \cdot p \cdot (u^2) \cdot S_{Lref} \cdot C_L$$

$$F_S = \tfrac{1}{2} \cdot p \cdot (u^2) \cdot S_{Sref} \cdot C_S$$

If $S_{Lref} = S_{Sref}$ then $(C_L = C_S)$ and, thereby, $(F_L = F_S)$ $$P = \tfrac{1}{2} \cdot p \cdot A (u^3)$$

Where:
$F_{AMP}$=Dimensionless sum of the total forces exerted on the Wind Wall.
$F_D$=Drag force or resistance of the Wind Cell.
$F_L$=Lift force (upper and lower) on the Wind Cell measured from the inside out.
$F_S$=Lateral force (left and right) on the Wind Cell measured from the inside out.
P=Available power.
p=Air density.
u=Wind speed.
A=Wind Cell projected area perpendicular to the wind direction.
$S_{Lref}$=Blade surface projection corresponding to lift force.
$S_{Sref}$=Blade surface projection corresponding to lateral force.
$C_D$=Aerodynamic coefficient of resistance or drag of the object facing the wind. Determines the aerodynamic performance of the wind system in the opposite direction to the wind direction.
$C_L$=Aerodynamic coefficient of sustainability. Determines the aerodynamic performance of the wind system in the opposite direction to gravity.
$C_S$=Lateral aerodynamic coefficient. Determines the aerodynamic performance of the wind system in the direction perpendicular to the direction of the wind and gravity.

In relation to the structural geometry of the Wind Wall (101), it must be understood as that solid structure composed of a finite number of individual and aerodynamic units called Wind Cells (104), which are located adjacently, one next to another, in an orderly and symmetrical manner, characterized by forming as a whole a continuous structure of Wind Cells (104), whose weight is supported in itself by the structure of Wind Cells (104) and whose configuration allows to build a configurable structure along the three physical dimensions in terms of height, length, and width. That is, by using Wind Cells (104) it is possible to build a Wind Wall (101) of completely modular dimensions in such a way that the resulting aerodynamic structure is an optimized structure for certain environmental, technical and economic conditions.

It is important to indicate that, notwithstanding that in this document we speak of a Wind Wall (101) built by a finite number of Wind Cells (104), the foregoing does not rule out the possibility that the Wind Wall (101) can be formed based on a single massive Wind Cell (FIG. 3) that encompasses the entire dimension of the Wind Wall (101). In this case, the Wind Wall (101) will be equivalent to the massive Wind Cell.

Additionally, the Wind Cell (FIG. 3) must maintain a plane of mirror or bilateral symmetry, which must be located along the axial axis of the Wind Cell, the axial axis being that which is parallel to the wind flow and/or that connects and/or communicates the Wind Inlet Opening (406) with the Wind Outlet Opening (407), in such a way that when the Wind Cell is cut in half by the plane of symmetry, the perpendicular distance of a point, and its image, to the plane of symmetry is the same.

Figure 4:
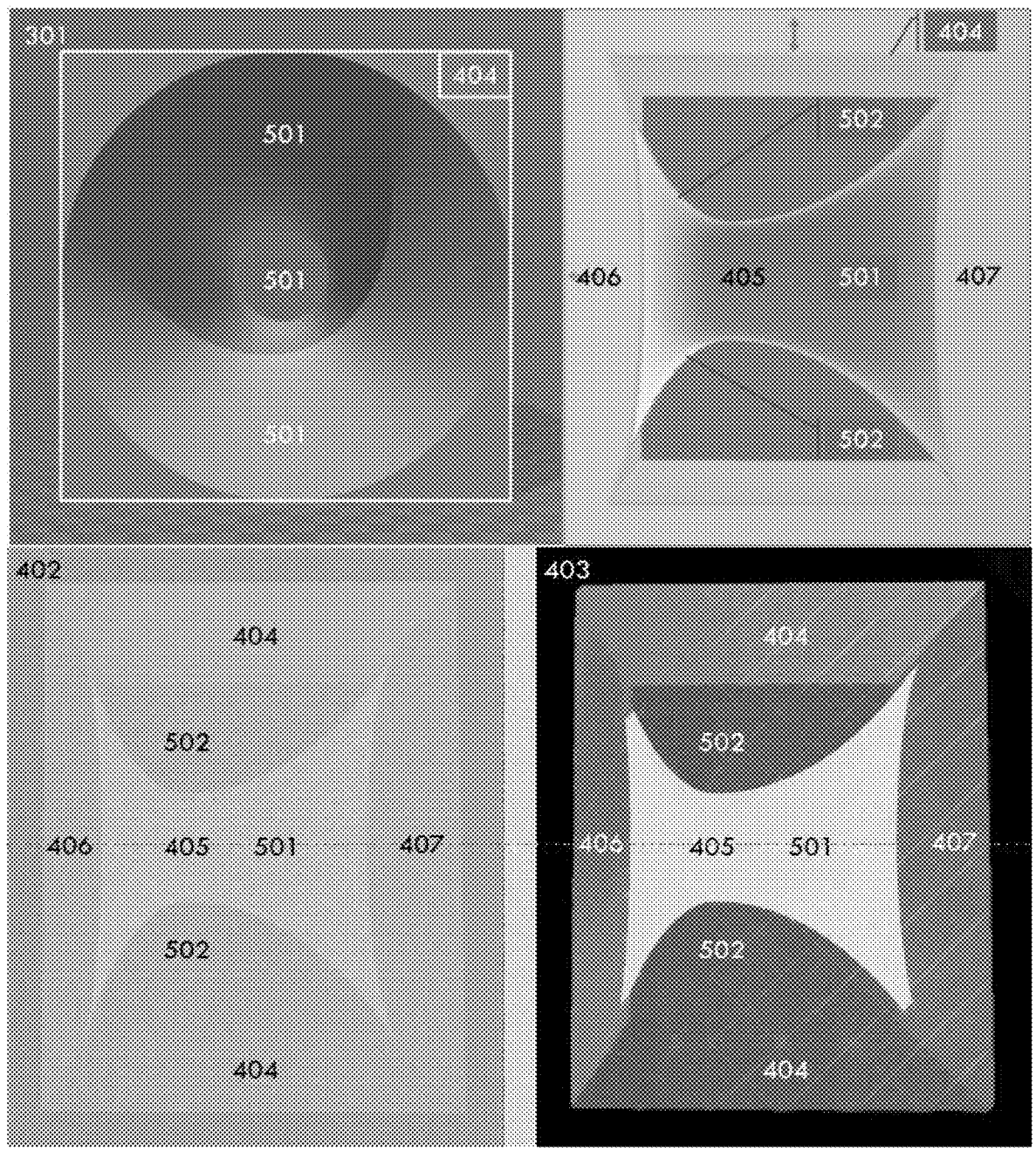
FIG. 4: Wind Cell Sections
401 Front view of a Wind Cell
402 Transparent and side view of a Wind Cell
403 Transparent, highlighted and side view of a Wind Cell
404 Adjacent Outer Section or Shared Closed String
405 Wind Cell Neck (405)
501 Internal Aerodynamic Chamber
502 Double Hyperboloid Profile or Upper Face (Extrados) Airfoil
406 Wind Inlet Opening
407 Wind Outlet Opening

The Wind Cell (104) must be understood as that aerodynamic and individual structure, functional by itself, composed of an Adjacent External Section (404) and an Internal Aerodynamic Chamber (501). It is important to specify that the Wind Cell and the Adjacent External Section (404) and the Internal Aerodynamic Chamber (501) are part of a whole, so they share the same mirror plane of symmetry and plane or axial axis of symmetry as the case may be. Each of these sections will be explained below (FIG. 4):

a) Adjacent External Section or Shared Closed Chord (404): it is the external section of the Wind Cell (104) where the air flow boundary layer (602) is formed. Additionally, the Adjacent External Section (404) corresponds to the exterior walls of the Wind Cell (104), which serve as adjacent limits in relation to the Wind Cells (104) located in the vicinity. The structure of the Adjacent External Section (404) must have the projection of a geometric figure along the axial axis. That is, the cross section, perpendicular to the axial axis of the Wind Cell (104), must show an Adjacent External Section (404) with the same geometric figure along its entire axial axis. Said geometric figure may be, without being limited to, polygonal, conical in section, or like a teardrop. In this sense, the Adjacent External Section (404) will have a cylindrical shape with the base of a geometric figure, be this a conic section (curve resulting from the different intersections between a cone and a plane, such as an ellipse, a parabola, a hyperbola or a circumference), an undulating figure (like a teardrop or a wave) or a polygon (regular or irregular).

Figure 3:
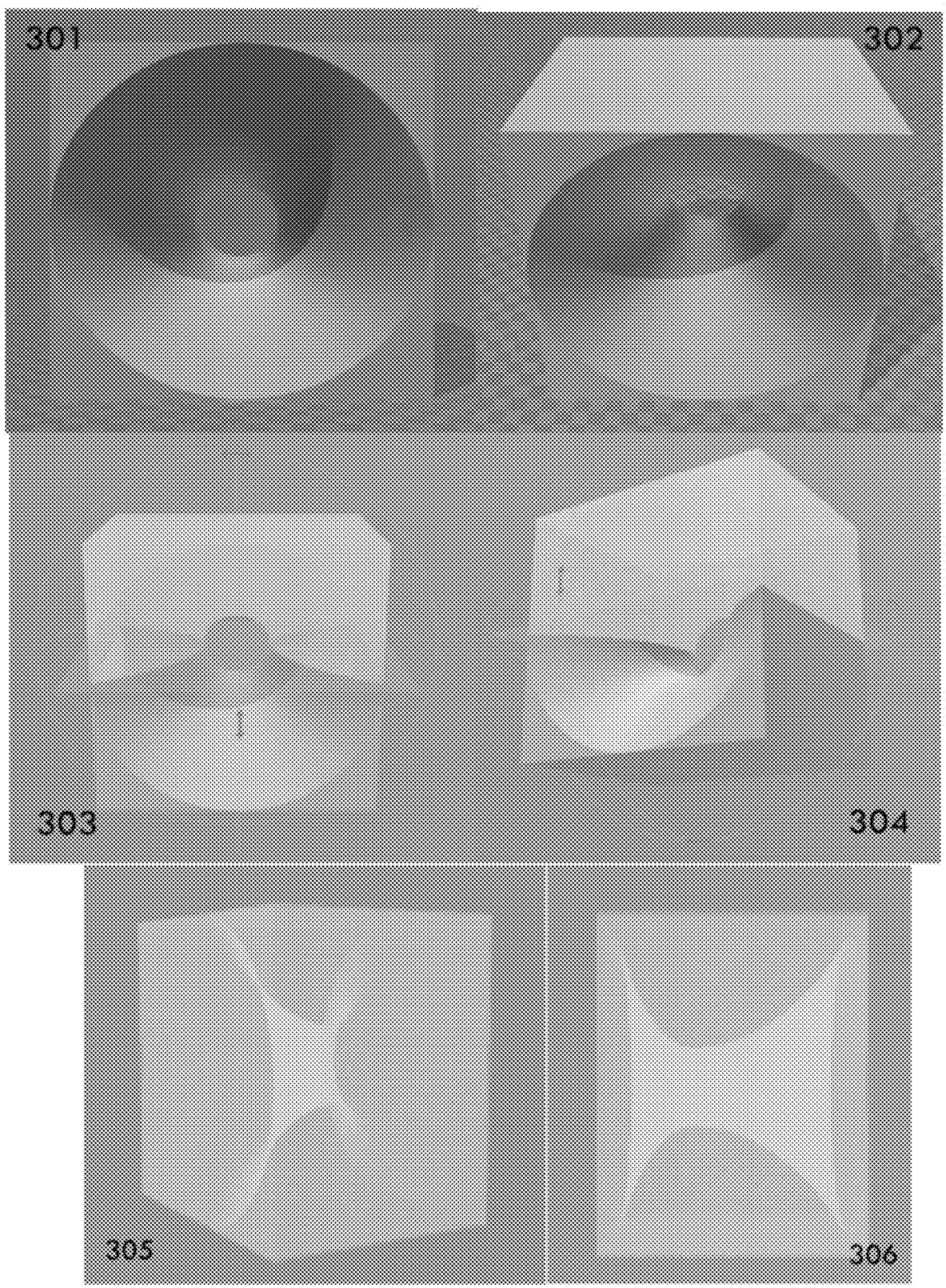
FIG. 3: Wind Cell
301 Front view of the Wind Cell
302 Oblique view of the Wind Cell from behind
303 Front view of the Wind Cell with the plane of symmetry
304 Oblique view of the Wind Cell with the plane of symmetry
305 Oblique and transparent view of the Wind Cell
306 Transverse and transparent view of the Wind Cell

FIG. 3 shows a Wind Cell with the Adjacent External Section (404), seen from a plane perpendicular to the axial axis, in the shape of a square. However, it should be understood that the external shape of the Wind Cell (104) is not limited to a square, being able to use for such purposes any geometric figure, as indicated in the previous paragraph, such as the circular, triangular, hexagonal, octagonal shape, among others.

The cross section of the Adjacent Outer Section (404) can conform to the shape of any geometric figure, as long as said geometric figure is capable of containing an imaginary circle inside. The reason for this condition lies in the need to suppress, as far as possible, the angles, for they could generate aerodynamic losses within the Internal Aerodynamic Chamber (501). However, on the other hand, the angular geometric figures (such as polygons) optimize the use of space and facilitate the construction of the Wind Wall (101).

The reason why the Adjacent External Section (404) is also called a Shared Closed Chord is because the walls of the external part of the Wind Cell (104) coincide with the chord of the airfoil of the Internal Aerodynamic Chamber (501). That is, theoretically, each Wind Cell (104) shares a section of the chord of its airfoil as many times as there are sides of the polygon of its cross section, as long as the Wind Cell (104) is not a circular cylinder and is not placed at the ends of the Wind Wall (101) where adjacent Wind Cells (104) would not be present. Therefore, the adjacent Wind Cells (104), through the Adjacent External Section or Shared Closed Chord (404), share the same chord in the section portion where the adjacent boundary is shared.

The importance of the Adjacent External Section (404) lies in the fact that, its own geometric structure, allows each Wind Cell (104) to function as a modular building block, in such a way that by means of a finite number of Wind Cells (104) a Wind Wall (101) of configurable dimensions can be built. It is important to indicate that the configuration of the Wind Wall (101) is not limited to Wind Cells (104) of the same size and the same geometry of the Adjacent External Section (404), but that Wind Cells (104) of dimensions different and different geometries can be used, or a combination of both, without limitation.

Figure 5:
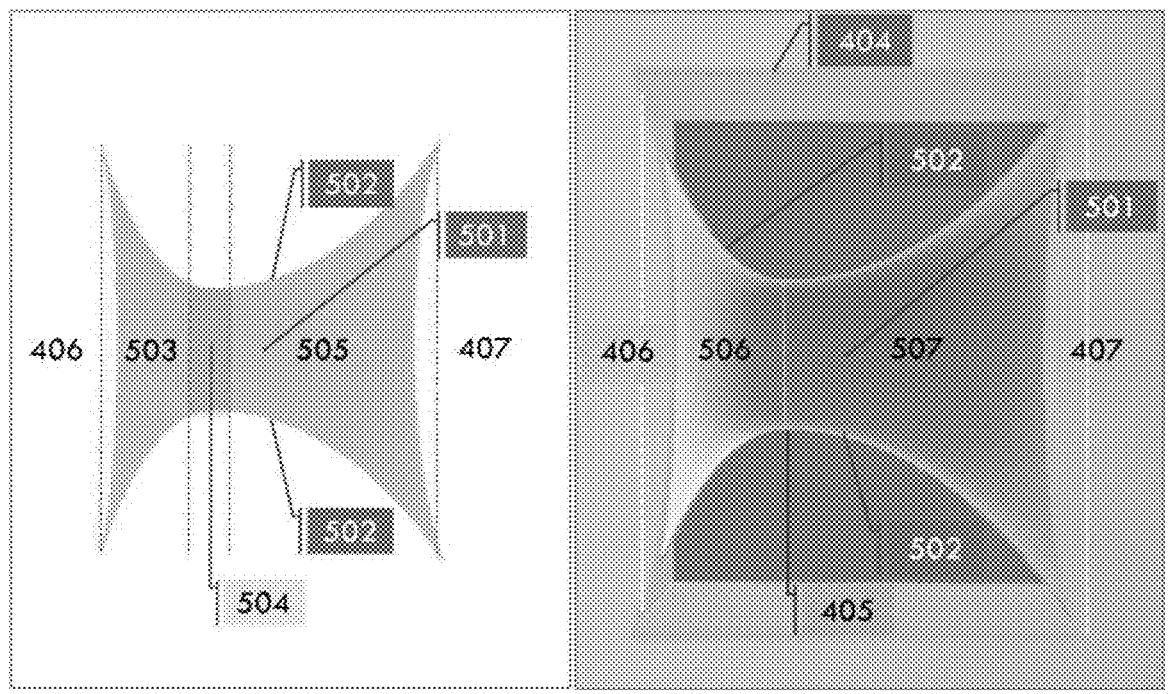
FIG. 5: Parts of the Internal Aerodynamic Chamber
501 Internal Aerodynamic Chamber
502 Double Hyperboloid Profile or Upper Face (Extrados) Airfoil
503 Pressure Generating Space
504 Critical Space
505 Turbulence Suppressor Space
506 Inlet Hyperboloid
507 Outlet Hyperboloid
405 Wind Cell Neck
406 Wind Inlet Opening
407 Wind Outlet Opening

In summary, the Adjacent External Section (404), or Shared Closed Chord, is the physical limit shared by each of the Wind Cells (104) that make up the Wind Wall (101). In this way, the Adjacent External Section (404) is characterized by having a cylindrical shape with a geometric base in a polygonal, wavy, or conical section, from the perspective of a cross section, whose structural projection configures two important attributes: (i) it is that section that constitutes the shared chord of the airfoil of each adjacent Wind Cell (104) and, at the same time, (ii) is that section of the Wind Cell that allows the Wind Cell (104) individually to function as a modular building block in the construction of the Wind Wall (101) as a whole.

b) Internal Aerodynamic Chamber (FIG. 5): it is the interior section of the Wind Cell where the pressure differentials are generated and, therefore, where the wind speed differentials are formed. Additionally, the Internal Aerodynamic Chamber (501) corresponds to the space of the Wind Cell where the lift forces created by a revolutionized aerodynamic profile are generated.

The Internal Aerodynamic Chamber is shaped like an extrados airfoil. This profile is partially based on the airfoil profile. The profile uses the extrados (upper face) of the airfoil as the internal face of the Internal Aerodynamic Chamber (501). In other words, by using only the upper face of the airfoil and leaving aside the intrados of the airfoil itself, it is as if the profile of the Internal Aerodynamic Chamber (501) had been sectioned along the chord of the airfoil in question, thus leaving the Internal Aerodynamic Chamber (501) conformed only by the profile of the extrados. Therefore, the aerodynamic profile of the Internal Aerodynamic Chamber (501) is achieved by the revolution of the extrados around the axial axis of the Wind Cell, resulting in a continuous aerodynamic profile along its plane of symmetry. It is important to specify that, since the profile of the Internal Aerodynamic Chamber (501) must be centered and adjusted to the shape of the Adjacent External Section (404), the thickness of the Extrados Airfoil (502) (distance between the edge of the profile and rope) will be different in each section of the Wind Cell.

Additionally, the narrowest area of the Internal Aerodynamic Chamber (501) can be circular, but it will not be limited only to this circular shape, but it can also be of a different shape (like a rectangle within which more than one wind turbine could fit), as long as said shape is rounded at its ends. For these alternative and special configurations, the concept of creating the complete figure by the revolution of the extrados around an axial axis would no longer be applicable; however, the extrados airfoil would still be maintained, seen from a cross section.

It is important to point out that both the Wind Inlet Opening (406) and the Wind Outlet Opening (407) of the Wind Cell must be equal and have identical dimensions or at least substantially identical dimensions, where the leading edge of the Extrados (Upper Face) Airfoil (502) is arranged contiguously and perpendicular to the Wind Inlet Opening (406) and where the trailing edge of the Extrados (Upper Face) Airfoil (502) is arranged contiguously and perpendicular to the Wind Outlet Opening (407), Additionally, with respect to the geometric shape, the Wind Outlet Opening (407) and the Wind Inlet Opening (406) of the Wind Cell you may choose any of the following alternatives: (i) keep the same geometric shape of the cylindrical base of the Adjacent Outer Section; (ii) preserve the same geometric figure of the Neck of the Wind Cell (405); (iii) preserve a circular figure on the margin of the geometric figure of the Neck of the Wind Cell (405).

In a preferred embodiment, the extrados airfoil of the Internal Aerodynamic Chamber may have the shape of a profile of a double hyperboloid truncated and joined at the origin. This profile uses two unfinished single-leaf hyperboloids joined at the origin, the geometric figure of each hyperboloid being different from each other. The aerodynamic profile of the Internal Aerodynamic Chamber (501) can be adjusted to a variety of hyperboloids, as long as the first hyperboloid of an unfinished leaf at the origin (hereinafter, the inlet hyperboloid) facing perpendicular to the wind direction has a Wind Inlet Aperture (406) equal to the Wind Outlet Aperture (407) of the second hyperboloid of a unfinished-at-the-origin leaf (hereinafter, outlet hyperboloid) opposite the direction of the wind.

Additionally, as a prior condition, the dimensions of the circles at the origin of symmetry (point of origin in Cartesian space) of each hyperboloid of an unfinished leaf at the origin must be identical in such a way that the joint between both geometric figures is perfect, that is, that the Inlet Hyperboloid (506) and the Outlet Hyperboloid (507) together form a geometric figure with continuous axial revolution symmetry. In other words, the Double Hyperboloid Profile (502) is composed of an Inlet Hyperboloid (506) and an Outlet Hyperboloid (507), different from each other, joined at the origin, where, preferably, the magnitude (or internal volume) of the Inlet Hyperboloid (506) must be smaller than the magnitude (or internal volume) of the Outlet Hyperboloid (507), being that both hyperboloids must be united by their circles at the origin and having, as an essential condition, that the circles at the origin, of both the Inlet Hyperboloid (506) and the Outlet Hyperboloid (507) coincide and are of equal dimensions in such a way that the Double Hyperboloid Profile (502) is a continuous and symmetrical structure along its axial axis. It is important to indicate that the Wind Inlet Opening (406), located in the Inlet Hyperboloid (506), and the Wind Outlet Opening (407), located in the Outlet Hyperboloid (507) of the Wind Cell must have a circular shape of identical or substantially identical dimensions.

Since the Adjacent Outer Section (404), which surrounds the Internal Aerodynamic Chamber (501), can have different geometric figures, it should be expected that the distance between the Shared Closed Chord (404) and the aerodynamic profile of the Internal Aerodynamic Chamber (501) is variable throughout the entire span of the Wind Cell (104), being that the greatest distance must be at the height of the Neck of the Wind Cell (405).

The aerodynamic profiles of the Internal Aerodynamic Chamber (501) have similar characteristics that correspond to: (i) both the Wind Inlet Opening (406) and the Wind Outlet Opening (407) of the Internal Aerodynamic Chamber (501) must keep the same geometric shape; and (ii) the aerodynamic profiles of the Internal Aerodynamic Chamber (501) of the Wind Cell must maintain the same plane of symmetry of the Wind Cell.

It is important to note that a Wind Cell, being located next to or in line with another Wind Cell, seen from a transverse plane passes parallel through the axes of axial symmetry of both cells, together they build a complete airfoil whose chord corresponds to the External Section Adjacent (404) shared between each Wind Cell (104) and, for its part, the Internal Aerodynamic Chamber (501) of each Wind Cell corresponds to the extrados (or intrados) of the airfoil, respectively. This has the technical advantage that it takes advantage of the complete airfoil to aerodynamically divert the wind through both openings of two adjacent cells, producing a synergistic effect of increasing wind speed, while taking advantage of the space used and reduces the amount of material used in manufacturing.

The Internal Aerodynamic Chamber (501), being a whole with its components, regardless of the specification level of the profile used, configures three differentiable areas, which present very different physical observable magnitudes. Said differentiable areas are, in the order of the wind direction: (i) a front section or pressure generator space, (ii) a middle section or critical space; and (iii) a posterior section or turbulence suppressing space.

i) Pressure Generating Space (503); It is that space whose axial axis is aligned to the wind direction and whose surface faces the wind directly. The Pressure Generating Space (503) corresponds to the space located between the area of the Wind Inlet Opening (406) and the high-speed Critical Space (504), with Pressure Generating Space (503) being an area characterized by withstanding the greatest drag force of the wind and presenting the highest levels of pressure. In physical terms, the Pressure Generating Space (503) must correspond to the spatial volume with the scalar magnitudes of static pressure that are above the ambient pressure.

ii) Critical Space (504); It is that space located between the Pressure Generating Space (503) and the Turbulence Suppressing Space (505). The Critical Space (504) is characterized by presenting both the lowest levels of static pressure and the highest records of wind speed and dynamic pressure. Due to the characteristics of the physical magnitudes present in this space, the Critical Space (504) constitutes that space where the wind turbine rotor must be located in order to take advantage of the high concentration of kinetic energy of the wind that is centered in said space. In physical terms, the Critical Space (504) should correspond to the spatial volume that contains the positive differentials of the vector magnitudes of the wind speed. Coincidentally, if we section the Internal Aerodynamic Chamber (501) with transverse planes along its entire axial axis, we would find the plane with the smallest sectioned area of the Internal Aerodynamic Chamber (501), it would be within the Critical Space (504). That is, it must be expected that the Neck of the Wind Cell (405) is within the Critical Space (504).

iii) Turbulence Suppressor Space (505); It is that space whose axial axis is aligned to the direction of the wind, but whose surface does not face the wind directly. The Turbulence Suppressor Space (505) corresponds to the space located between the Critical Space (504) and the area of the Wind Outlet Opening (407), being a space that is characterized by withstanding the least resistance force of the wind and by presenting the process of leveling the magnitudes of wind speed and pressure with respect to the surrounding environment. In physical terms, the Turbulence Suppressor Space (505) should correspond to the spatial volume that registers the negative differentials of the vector magnitudes of the wind speed after the Critical Space (504).

The differentiable areas of the Internal Aerodynamic Chamber (501) indicated above do not have pre-established physical limits, but rather scalar limits of the prevailing physical magnitudes. That is, the differentiable areas of the Internal Aerodynamic Chamber (501) are differentiable from each other because each space is characterized by a particular behavior of the physical magnitudes present within the Wind Cell.

In summary, the Internal Aerodynamic Chamber (501) is characterized by being that interior space of the Wind Cell where the pressure and wind speed differentials are generated, being a space constituted by three differentiable areas, which present very different observable physical magnitudes. Said differentiable areas are, in the order of the wind direction: (i) the Pressure Generating Space (503); (ii) the Critical Space (504); and (iii) the Turbulence Suppressor Space (505).

Next, it is important to explain the fundamentals of the Wind Wall

Having established the constituent parts of the Wind Wall (101), let us imagine for the purposes of this analysis a plane with a circular hole in the middle (hereinafter, "hollow flat disk"), which would have the same projected surface as the Wind Cell (104) and a circular hole in the middle with the same area of the Neck of the Wind Cell (405). It is important to indicate that, even though, the Wind Cell (104) and the "hollow flat disk" share the same projected areas and, therefore, receive the same amount of kinetic energy from the wind, the existing differences in the aerodynamic coefficients of both objects, are to explain the differences in pressure gradients and wind speed produced by each of the aerodynamic objects in question.

Despite the fact that both objects interact with the wind forces respectively, the drag force on the Wind Cell (104), due to aerodynamic effects, is less than the drag force exerted by the wind on the "hollow flat disk", which implies that the Wind Cell (104), in a certain way, absorbs a lesser amount of kinetic energy from the wind compared to the "hollow flat disk", allowing the difference between said kinetic energy to be conserved by the movement of the air itself.

The Wind Cell (104), in addition to facing a drag coefficient, also interacts with lift coefficients created by its unique aerodynamic geometry which generates lift forces along its blade surface of the Internal Aerodynamic Chamber (501). In this sense, it is important to indicate that the blade surface of the Internal Aerodynamic Chamber (501) is circular, so the vectors of the lift forces generated are directed concentrically towards the interior of the Internal Aerodynamic Chamber (501). These lift forces, when they are concentrated in the Critical Space (504), produce a temporary state of greater amplification of the wind speed and, consequently, dynamic pressure.

The above implies that the amount of kinetic energy of the wind conserved and amplified, as a result of the aerodynamic shape of the Wind Cell (104), is a consequence of the lift forces concentrated within a Critical Space (504), responsible for the differential of pressures and increase in the wind speed to which the air mass is subjected in its movement towards the Wind Outlet Opening (407) of the Wind Cell.

The incidence of the Wind Wall (101) in the amplification of the kinetic energy of the wind is possible thanks to two elements: the size of the projected area of the Wind Wall (101) and the aerodynamic coefficients of the Wind Cells (104) constituting the Wind Wall (101). In other words, the increase in available power achieved by the Wind Wall (101) will be a function of the projected area and optimization of the aerodynamic coefficients of the Wind Cells (104) applied, as well as the particular characteristics of the prevailing wind resources that surround a given wind system.

Figure 6:
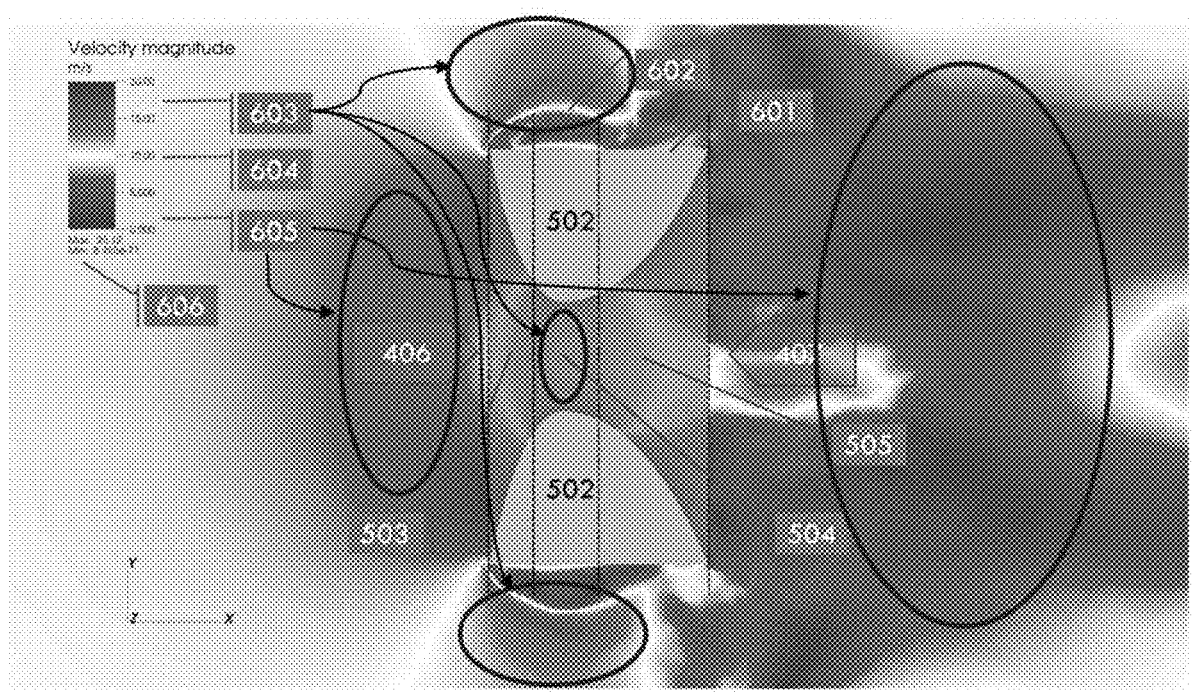
FIG. 6: CFD (Computational Fluid Dynamics) simulation
601 Cross-sectional view of a Wind Cell
602 Boundary layer of air flow
603 Maroon legend zone indicating wind speed above ambient wind speed
604 White area of legend indicates input or ambient wind speed
605 Light blue zone of the legend that indicates a wind speed below the ambient wind speed
606 Indicator of the minimum speed and maximum speed represented in the CFD simulation
502 Double Hyperboloid Profile or Extrados (Upper Face) Airfoil
503 Pressure Generating Space
504 Critical Space
505 Turbulence Suppressor Space
406 Wind Inlet Opening
407 Wind Outlet Opening

According to the CFD simulations (FIG. 6), the Wind Wall (101) would allow increasing the wind speed, within the Critical Space (504), by around 3.5 times, taking into account that the maximum amplification of the achievable wind speed is indeterminate (but not infinite), since it will depend on the respective configurations of the projected area and the aerodynamic coefficients of the Wind Wall (101) as a whole. FIG. 6 shows a legend where the white zone (604) corresponds to the ambient wind speed equivalent to 10 m/s, the first zone (605) corresponds to the spaces where the wind speed falls below the speed of the ambient wind and the second zone (603) corresponds to the spaces where the wind speed rises above the ambient wind speed. As can be seen, the second zone is located mainly in two regions: outside the Wind Cell, specifically in the boundary layer of the air flow (602), and in the Critical Space (504). Likewise, the legend of FIG. 6 shows the minimum speed and the maximum speed (606) calculated by the CFD simulation.

It is important to specify that the limit of the amplification of the wind speed, product of the application of the Wind Wall (101), is defined as a dependent function of the drag coefficient and the lift coefficient of the Wind Wall (101), where the drag coefficient has an inverse relationship and the lift coefficient carries a direct relationship, respectively. In this sense, although a larger projected area of the Wind Wall (101) could be beneficial in terms of a larger reference scanning surface, it is important to take into account that from a certain point the larger dimensions of the projected areas of the Wind Wall (101) could present diminishing returns in some regions of the Wind Wall (101) as a result of a higher drag coefficient. However, on the other hand, the drag and lift coefficients present curves with positive partial derivatives, which indicates that the negative effects of a higher drag coefficient may be accompanied (not related) by a higher lift coefficient and, therefore, in a higher dynamic pressure product of the present lift force. In this sense, for the selection of the ideal dimensions of the Wind Wall (101) it is important to study and find the optimum point where, given certain environmental conditions, the drag coefficient and the lift coefficient generate the highest dynamic pressure of the wind within the Critical Space (504) of the Wind Cells (104) that make up the Wind Wall (101).

In summary, the Wind Wall (101) described above is a new generation of wind systems that increases the wind speed and, therefore, the intensity of the kinetic energy circumscribed to a Critical Space (504) within the Wind Cell (104) and consequently, it raises the available power, given a certain kinetic energy of the wind, constant or inconstant, thus allowing a higher performance in the generation of electrical energy. Thus, the Wind Wall (101) solves the technical problem related to the low use of the potential kinetic energy of the wind, in such a way that, for the same wind resource, the application of the Wind Wall (101) will allow a better use of the kinetic energy of the wind available in nature and increase the generation of power given the same wind resource in question.

Regarding the configuration of the Wind Wall (101), due to the fact that it is made up of a finite number of Wind Cells (104), there may even be the case of the formation of a Wind Wall (101) based on a single Wind Cell; the total configuration of the Wind Wall (101) will therefore be based on the sum of the individual configurations of each Wind Cell.

On the other hand, the Wind Cell, individually, does not need to have a homogeneous configuration. That is, Wind Walls can be built based on homogeneous and symmetrical Wind Cells (104), but they can also be built based on Wind Cells (104) of different configuration in terms of different sizes, dimensions and geometric shapes of the Adjacent External Section (404) and/or aerodynamic profiles of the Internal Aerodynamic Chamber (501). In other words, the options for the configuration of the Wind Wall (101) are endless.

The choice of the most suitable configuration of the different Wind Cells (104) that will make up the Wind Wall (101) should be made based on the study of the predominant wind resource in the installation site of the Wind Wall (101), as well as on the basis of the technical parameters, economic restrictions, expected yields, available techniques, required environmental limitations and expected operational limits for a specific project, among others. That is, there may be as many optimal forms of the Wind Wall (101) as wind systems are created.

Regarding the clamping (fastening) and supporting elements, it is important to indicate that the Adjacent External Section (404) of each Wind Cell constitutes a structural support by itself. Because the Wind Cells (104) will be exposed to considerable lift and resistance forces, the internal part of the Wind Cell (that is, that part enclosed, not directly exposed to the environment) must be adequately reinforced as appropriate. Likewise, since the Wind Cells (104) that make up the Wind Wall (101) will behave as a whole, it is important to take into account the construction of fixing structures to maintain the integrity of the Wind Wall (101) as a whole. In this sense, the Wind Wall (101), in terms of clamping and support, is a self-sustaining structure based on the same Wind Cells (104) that constitute it, not requiring elevated vertical supports as in the case of conventional wind turbines. Notwithstanding, the determination of fixing and support structures, to maintain the integrity of the Wind Wall (101) as a whole, is necessary. Regarding the technique to be used for the construction of the clamping and structural support elements required by the Wind Wall (101), we indicate that it is alien to this discussion and will depend exclusively on the studies and technical recommendations of the branch of engineering specializing in the matter.

On the other hand, the application of the Wind Wall (101) offers in itself a new generation of wind systems based not only on the mechanical and aerodynamic efficiency of the wind turbine, but also on the structural and aerodynamic efficiency of the Wind Wall (101) as an element to amplify the wind speed and the underlying power density. In this sense, the benefits provided by the application of the Wind Wall (101) are the following:

Increase in wind power density. Due to the driven increase in wind speed achieved by the present invention, given a certain kinetic energy of the wind in nature, the Wind Wall (101) generates a power density greater than which a conventional wind system could deliver, which It does not use any physical structure to increase the speed of the wind, but only takes the kinetic energy of the wind as it occurs in nature.

Increase in the specific power factor. Given the same projection surface of the system, the Wind Wall (101) provides a substantially higher level of power per square meter (specific power factor or power coefficient) compared to conventional wind systems. According to the analysis and simulations previously carried out, the specific power factor would double in value compared to conventional wind systems.

Smaller diameter of the Wind turbine rotor. Compared to conventional wind turbines that work with the wind available in nature without any modification, through the application of the aerodynamic structure of the Wind Cell that allows increasing the wind speed within a Critical Space (504), where it will be located the rotor of a wind turbine, a greater amount of power can be generated with a smaller diameter size of the rotor of a wind turbine.

Lower cost per unit of generating power. As a result of the higher power coefficient and smaller size of the wind turbine rotor that the Wind Wall (101) offers, it is estimated that the level of investment per unit of power, measured in dollars per kilowatt (US $/kW), is lower than the investment level per unit of power of conventional wind systems.

Summing it up, the Wind Wall (101) has special relevance in increasing wind power density and specific power and, as a consequence, in increasing electric power generation capacity, given the same wind resources available in nature and, in an important addition, incurring in lower costs.

The invention claimed is:

1. A Wind Wall, comprising:
a plurality of Wind Cells (104), where the Wind Cells are arranged adjacent to each other, compounding as a whole a continuous structure; where the Wind Cells are modular;
wherein each Wind Cell has an individual structure, functional in itself, through which the wind passes from a wind inlet opening (406) placed on one side of the Wind Cell, to a wind outlet opening (407) placed on the opposite side of said Wind Cell;
wherein the wind inlet opening (406) and the wind outlet opening (407) are communicated and have the very same dimensions;
wherein each Wind Cell comprises an internal aerodynamic chamber (501) in its interior with a shape of a revolutionized extrados (upper face) of an airfoil, where the shape of the revolutionized extrados is obtained by rotating an extrados around the axis of symmetry of the Wind Cell;
wherein each Wind Cell comprises an adjacent outer section (404) formed by the outer walls of the Wind Cell;
wherein the revolutionized extrados (upper face) of the airfoil of the internal aerodynamic chamber (501) consists of a profile of a double hyperboloid truncated and joined at the origin, taking into account that the double hyperboloid profile comprises an inlet hyperboloid (506) facing the wind direction, disposed adjacent and perpendicular to the wind inlet opening (406), and an outlet hyperboloid (507) not facing the wind direction, placed adjacent and perpendicular to the wind outlet opening (407);
wherein the geometric shapes of the inlet hyperboloid (506) and the outlet hyperboloid (507) of the same Wind Cell are different from each other, with a magnitude or internal volume of the inlet hyperboloid (506) being smaller than the magnitude or internal volume of the outlet hyperboloid (507);

the joint between two adjoining Wind Cells, seen from a cross-section that passes parallel through the axis of symmetry of both Wind Cells, exhibits a shape of a complete airfoil, and both Wind Cells are arranged as sharing a same chord; where this chord is contained by the adjacent outer section (404) of both Wind Cells; and, wherein the inlet hyperboloid (506) and the outlet hyperboloid (507) are both a one-sheet hyperboloid truncated and joined at the origin by identical circles in such a way that the connection between both geometric figures is continuous, that is, that the inlet hyperboloid (506) and the outlet hyperboloid (507) together form a continuous geometric figure with axial revolution symmetry.

2. The Wind Wall, according to claim 1, wherein the adjacent outer section (404) and the Wind Cell share the same plane of symmetry and plane or axial axis of symmetry, wherein the plane of symmetry is located along the axis of symmetry;

wherein a cross section perpendicular to the axial axis of the Wind Cell shows an adjacent outer section (404) with the same geometric figure along its entire axis of symmetry;

wherein said geometric figure corresponds to the cylindrical base of the adjacent outer section (404) which can have a polygonal shape, a conical section shape, a wavy or teardrop shape.

3. The Wind Wall, according to claim 1, wherein the internal aerodynamic chamber (501) and the Wind Cell share the same mirror plane of symmetry and axis of symmetry, wherein the plane of symmetry is located along the axis of symmetry.

4. The Wind Wall, according to claim 3, wherein the internal aerodynamic chamber (501) comprises, positioned in the same direction of the wind, a pressure generating space (503), a critical space (504), a throat of the Wind Cell (405) and a turbulence suppressor space (505);

wherein the pressure generating space (503) is located between the area of the wind inlet opening (406) and the critical space (504), the pressure generating space (503) being the space that supports the greatest drag force and presents the highest levels of pressure;

wherein the critical space (504) is located between the pressure generating space (503) and the turbulence suppressor space (505), the critical space (504) being the space with the lowest pressure levels, with the highest records of the wind speed and where the throat of the Wind Cell (405) is located; furthermore, the critical space (504) is the suitable area to locate a rotor of a Wind turbine;

wherein the turbulence suppressing space (505) is located between the critical space (504) and the area of the wind outlet opening (407), the turbulence suppressing space (505) being the space where the wind pressure and speed begin to be normalized in relation to the surrounding environment.

5. The Wind Wall, according to claim 1, wherein the extrados (upper face) airfoil comprises: a leading edge placed contiguously and perpendicularly to the wind inlet opening (406); and a trailing edge disposed contiguously and perpendicularly to the wind outlet opening (407).

6. The Wind Wall, according to claim 1, wherein the distance between the adjacent outer section (404) and the aerodynamic profile of the internal aerodynamic chamber (501) is variable throughout the entire span of the Wind Cell, taking into account that the greatest distance is located at the throat of the Wind Cell (405).

7. The Wind Wall, according to claim 1, wherein the wind outlet opening (407) and the wind inlet opening (406) of the Wind Cell can have either a circular shape or the same geometric figure of the cylindrical base of the adjacent external section (404).

* * * * *